Figure 1:
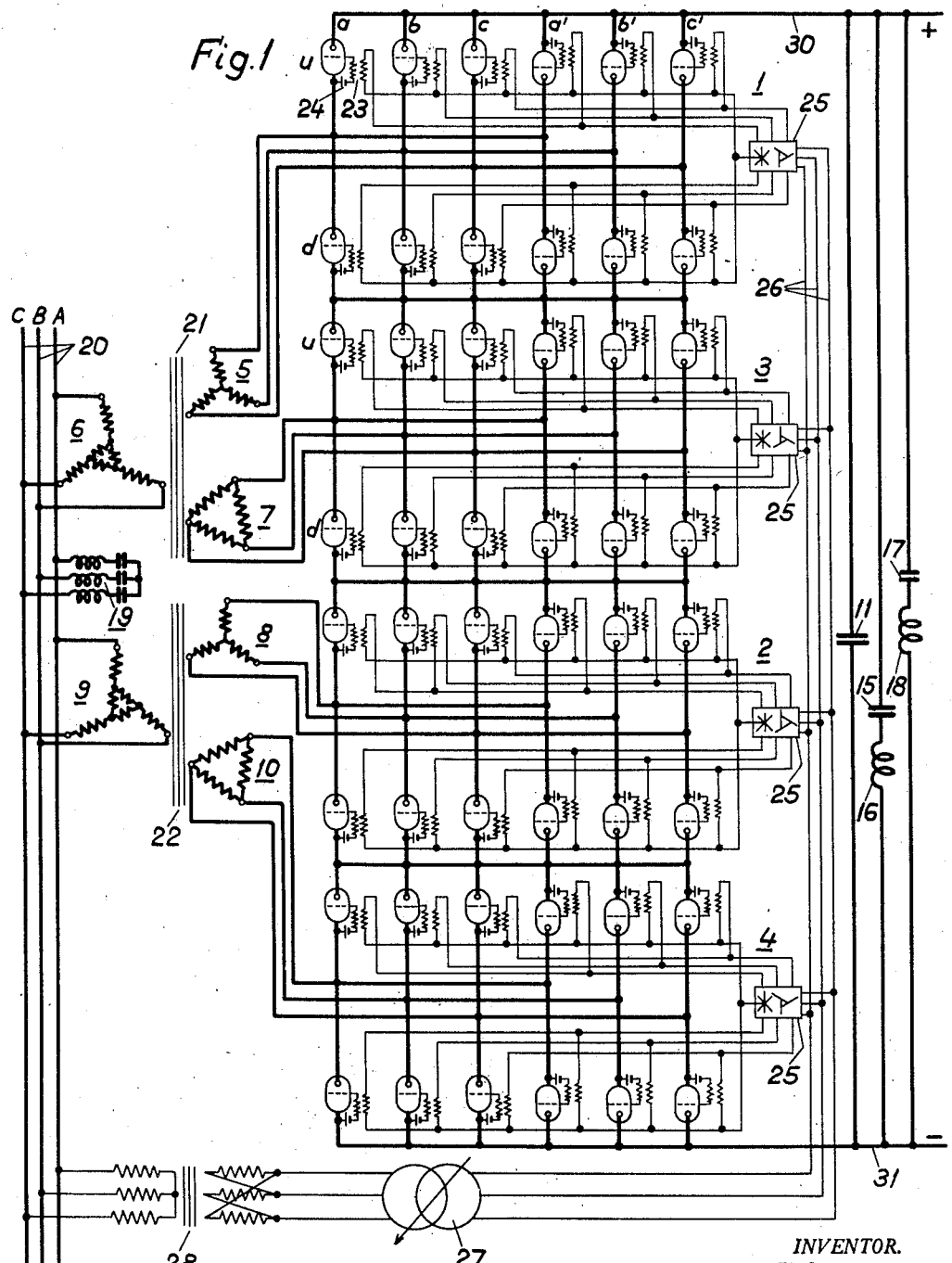

Jan. 14, 1958   E. UHLMANN   2,820,189
STATIC CURRENT CONVERTER USING VOLTAGE COMMUTATION
Filed Aug. 14, 1956   2 Sheets-Sheet 1

INVENTOR.
Erich Uhlmann
BY
— Attorney

Jan. 14, 1958     E. UHLMANN     2,820,189
STATIC CURRENT CONVERTER USING VOLTAGE COMMUTATION
Filed Aug. 14, 1956     2 Sheets-Sheet 2
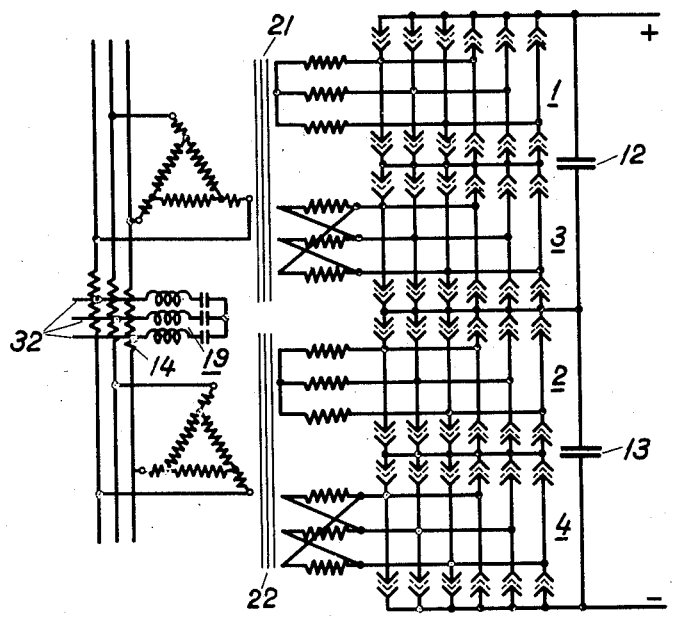
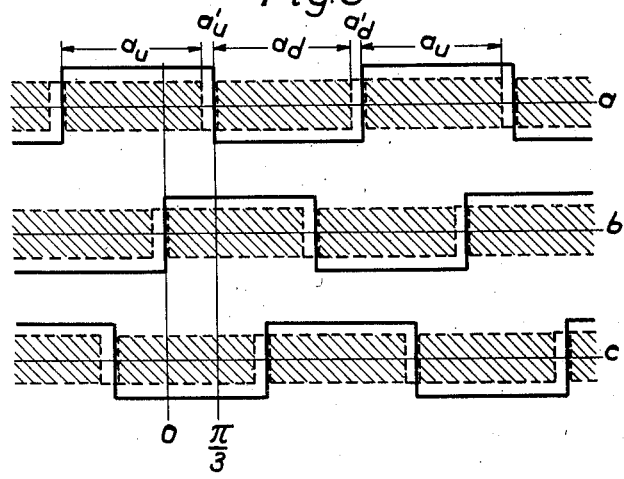
INVENTOR.
Erich Uhlmann
BY
James Dixon
Attorney.

United States Patent Office 2,820,189
Patented Jan. 14, 1958

2,820,189

STATIC CURRENT CONVERTER USING VOLTAGE COMMUTATION

Erich Uhlmann, Ludvika, Sweden, assignor to Allmanna Svenska Elektriska Aktiebolaget, Vasteras, Sweden, a Swedish corporation Application August 14, 1956, Serial No. 604,027

7 Claims. (Cl. 321—27)

The usual type of static current converter operates with what can be termed a current commutation, i. e. so that the current, which on the direct current side is usually smoothened by means of a reactor, is commutated between the different valve paths of the converter as the voltages impressed on these paths are altered. It is, however, also known to cause a static current converter to operate with what is termed a voltage commutation, which motion implies that the voltage on the direct current side is kept substantially constant, for instance by means of a condenser connected in parallel to the converter directly, without the intermediary of reactive elements, while the current between the terminals of the alternating side and of the direct current side passes alternatively through main valves and through auxiliary valves directed in the opposite sense, depending on the current direction at the instant when the alternating voltage of a certain phase passes through zero. (The alternating voltage cannot in this case be sine-shaped, if the converter has not an unlimited pulse number.) The commutation may be forced or spontaneous, in which latter case the alternating current side must be provided with members delivering the reactive power necessary for the commutation.

When static current converters are to be employed for high voltages, for instance for power transmission over a long direct current line, several constituent converters are generally connected in series, and for obtaining a high pulse number in such cases, the different constituent converters are generally connected on the alternating current side to transformer windings having voltages mutually displaced in phase. In voltage commutating converters, such a connection meets with certain difficulties, as is evident from the following.

In comparing the conditions in current and voltage commutating converters, a thorough examination shows that what is valid for the currents in one case is valid for the voltages in the other and vice versa. Thus for instance series connected current commutating converters, which are connected to the same line in different phase, load the line by currents the fundamental waves of which are equal in value and phase, while the harmonics are equal in value but of different phase. The same is found to be the case with the voltages of voltage commutating converters connected in parallel on the alternating current side and in series on the direct current side. The voltage harmonics lying in different phase and sometimes in directly opposite phases may thus, if the circuit is closed through the constituent converters, cause strong equalizing currents, and the present invention serves to prevent this inconvenience.

The object of the invention is thus to provide an arrangement of voltage commutating static current converters operating in different phase whereby a short-circuiting of voltage harmonics through the constituent converters is prevented. One example of such means may be the connection of interphase transformers between the alternating current terminals of the different main transformers. Another example may be the combination of the smoothening condensers of the different converters into one common condenser between the terminals of which the voltage harmonics may develop freely while at the same time balancing each other so as to cause no equalizing currents. These two kinds of means may also be combined, so that for instance the constituent converters are arranged in groups, each group with a common, smoothening condenser, while interphase transformers are connected in between the transformers or transformer groups of these converter groups.

It should be observed that equalizing currents could certainly be prevented by a series connection of the constituent converters on the alternating current side. This arrangement which is not included in the present invention cannot be employed in practice because such a connection excludes the possibility of properly dividing the voltage between the constituent converters.

Two different forms of the invention are diagrammatically illustrated in Figs. 1 and 2 of the accompanying drawing. Fig. 3 illustrates the relationship between currents and voltages during different phases.

In Fig. 1, the numerals 1–4 designate four six-pulse, two-way connected constituent current converters, which may be rectifiers or inverters, and which are connected to two transformers in such manner as to form together a composite 24-pulse converter. Each constituent canverter has, in a manner usual in voltage commutation, two valve paths between each alternating current terminal and each direct current terminal, one path indicated $a$, $b$ and $c$, the other path denoted $a'$, $b'$ and $c'$ respectively. The former valve path is normally operative and the latter admits current in the opposite direction, at a phase displacement between voltage and current during the parts of cycles when the current direction in relation to the voltage is opposite to the normal one. The four constituent current converters are connected in series on their direct current side between a plus conductor 30 and a minus conductor 31.

The constituent converter 1 is connected to a star-connected secondary winding 5 of a transformer 21, the primary winding 6 of which is connected in extended delta and so dimensioned, that its phase will be 7.5° in advance of that of a simple delta winding connected to the same line 20, the phases of which are denoted A, B and C, respectively. Since the secondary winding 5 is star-connected, it main voltage phase will be 30° in advance or in retard of that of the primary winding. If the former alternative is chosen, the phase of the secondary winding will be 37.5° in advance of that of the line.

The converter lying next to 1 in the series, which on account of the phase of its alternating current voltages is designated by 3, is connected to a delta-connected secondary winding 7 of the same transformer 21, whence its phase will be 30° in advance of that of the converter 1, thus 7.5° in advance of that of the line.

The next converter, designated by 2, is connected to a star-connected secondary winding 8 of a transformer 22, the primary winding 9 of which is connected in extended delta and has a phase 7.5° in retard of that of the line. As the secondary winding 8 on account of the star-connection has a phase 30° in retard of the primary winding 9, its phase will be 37.5° in retard of the line.

The fourth converter, designated by 4, is connected to a delta-connected secondary winding 10 on the same transformer 22 and in analogy with the foregoing this will give a phase of the converter 4 of 7.5° in retard of the line.

In each constituent converter the valves are shown in one upper row which valves may be given an index $u$ and a lower row in which the valves may be given an index $d$. Each value is provided with means for grid control, consisting of a transformer 23 and a biasing source 24. The valve operating normally as well as the valve admitting current in the opposite direction are connected to the same grid voltage, delivered by the grid potential device 25. This device is shown diagrammatically and mainly comprises a transformer. The symbols indicate that it is provided with a primary winding connected in extended delta and a star-connected secondary winding provided with six phase terminals and one neutral terminal. One grid potential device is provided for each constituent converter and the primary terminals of all devices are connected to leads 26 which are connected to a phase shifting means 27, which via a transformer 28 is connected to the line 20. By choosing different connections of the primary windings of the transformers in the grid potential devices, it is possible to accommodate to the phase connection of the valves in each constituent converter.

As each of the constituent converters is a six-pulse converter, it will also commutate in phase angles which are displaced by even multiples of 60° with respect to those above mentioned, and as a consequence, commutations take place in 24 different phases presenting a mutual difference of 15°, whence the whole converter will operate in a 24-pulse manner. The different constituent converters will commutate in the phase sequence 1, 2, 3, 4.

The aforesaid high pulse number has the consequence that no harmonics of a lower order number than 23 can enter the line, but on the other hand, if each constituent converter formed a complete unit with its own smoothening condenser, for instance the fifth and seventh harmonic in the converters 1 and 3, which are mutually displaced in phase by 180°, would add themselves together in the circuit which the condensers of both converters form with their common transformer. By introducing the common smoothening condenser 11, it is made possible that the voltage harmonics may form individually without causing any such equalizing currents.

19 designates a condenser battery which is intended to deliver the necessary reactive power for facilitating a spontaneous commutation. In series with each condenser, there is a reactor for damping harmonics.

In Fig. 1 some further details are shown which in some cases are important for smoothening the direct current voltage. Especially upon sudden load variations or switching operations, before the alternating current circuits have adapted themselves to the new operating conditions, there will be a direct current component in the alternating current circuit, to which corresponds an alternating current component of line frequency between the direct current terminals. For eliminating or essentially reducing this component, a series resonance circuit containing a condenser 15 and an inductance 16, mutually tuned for the frequency of the alternating current line, is connected between the direct current terminals.

If the alternating current line is subjected to an unsymmetric load (e. g. a load by which the currents are not displaced in phase by 120° but with which the sum of the currents is still zero), there will be an alternating voltage component of twice the line frequency between the direct current terminals. In order to substantially eliminate this component, as well a further series resonance circuit consisting of a condenser 17 and an inductance 18, tuned for twice the line frequency, is connected in Fig. 1 between the direct current terminals.

For the explanation of the operation of Fig. 1, reference is made to Fig. 3. It may be assumed that during a certain interval, e. g. between the phase angles 0 and $\pi/3$, the valve $a_u$ is assumed to be connected to the plus pole of the direct voltage and the valve $c_d$ to the minus pole of the constituent converter 1. During this interval corresponding valves $a_u$ and $a'_u$ and $c_d$ and $c'_d$ for both current directions are kept open. The same phases should also have carried the current in converters operating with current commutation. For determining the conditions necessary in potential commutation, one valve of phase $b$ is kept open during the above mentioned interval. It may be assumed that a valve pair $b_u$—$b'_u$ during this interval is connected to the plus pole. It is thus apparent that in potential commutation, always three valves carry the current, i. e. three of the above mentioned six valves. Which three of these six valves that are carrying the current at a certain instant is determined by the phase position of the phase currents. This is shown in Fig. 3 in which full drawn lines diagrammatically denote which valves are conducting during certain intervals. The full drawn lines do not reproduce the actual appearance of the voltage curves, but only denote that the corresponding alternating current phase is connected to the plus pole of the direct voltage if the full drawn line lies above the zero line, and to the minus pole if it lies below. The dashed lines refer to the corresponding phase currents. These lines are neither a true reproduction of the actual current form, but only indicate if the phase current flows in accordance with or in opposition to the direct voltage. The direction of the phase current must not be locked but must have a certain freedom depending on the properties of the alternating current network. During the hatched areas in the figure the current may thus have an arbitrary direction without influencing the mode of operation of the inverter. If all commutations shall be performed voluntarily it is necessary, however, that already a certain time before the potential shift, the current will assume that direction which the voltage has after the polarity shift, or in other words, the current should change its direction before the voltage, i. e. the alternating current network must be capacitive, or the reversal of current must be forced in one way or another. During intervals $a_u$ in Fig. 3, the valve path $a_u$ will carry current and valve $a_d$ is blocked. It is evident that current cannot flow through the parallel connected valve path $a'_u$ in its blocked direction and grid control of the latter valve (and the six similarly directed valves in each constituent converter) is therefore not required. Immediately before the zero passage of the alternating voltage the alternating current must have the same direction as the voltage has after the commutation. This is indicated in Fig. 3 in that valve $a'_u$ will carry the current during this interval. During interval $a_u$ current flows through valve $a_u$, through two windings of the transformer secondary 5, and through the released valve $c_d$ to minus. At the end of interval $a'_u$ valve $a_d$ is released. Irrespective of whether current passes through valve $a'_u$ or valve $a_d$, the current direction in the transformer phase in question will thus be unchanged when the voltage changes polarity. Valve $a_d$ will carry current until the current passes zero and then valve $a'_d$ will take over the current until the voltage commutates when the cycle is repeated again. It is obvious that, when all three phases co-operate, certain currents will be superposed on each other, but as a rule three of the valves in a constituent converter will always operate. The length of the hatched areas in Fig. 3 is dependent on the phase position of the alternating currents. If the phase position of the current is changed so much that interval $a_u$ will be equal to the length of interval $a'_u$, as shown, the valve system will operate as a rectifier. It may therefore be said that valves corresponding to $a$, $b$ and $c$ are inverter valves and that valves corresponding to $a'$, $b'$ and $c'$ are rectifier valves. When the intervals $a_u$ and $a'_u$ are equally long, the system will operate without active power transmission.

Fig. 2 shows in a more diagrammatic way than in Fig. 1, four constituent converters 1, 2, 3, 4 which are connected to two transformers 21 and 22 in accordance with Fig. 1. For voltage equalizing on the direct current side, there are provided in Fig. 1 two condensers 12, 13 one for each transformer 21 and 22. As each of these condensers is common to two constituent converters, the voltage harmonics created therein are prevented from causing any current in any short-circuit through the corresponding transformer. On the other hand, if no special steps for preventing this had been taken, a short-circuit current could form through both transformers, one converter pair and the condenser of the other. In order to prevent this, a three-phase interphase transformer 14 is connected in Fig. 2 between the primary windings of the two main transformers 21 and 22 and the three conductors of the line 32 are connected to the neutral points of these interphase transformers. In the windings of these transformers voltages are created, which are equal and opposite to the voltage harmonics of the same phase, whereby said harmonics can form freely also in this case without causing any short-circuit currents.

If, in a connection according to Fig. 2, resonance circuits of the same type as the circuits containing the members 15—18 in Fig. 1 are to be introduced, separate circuits of this character should be connected in parallel to each of the smoothening condensers 12, 13, respectively.

This application is a continuation-in-part of my application Serial No. 255,511, filed November 8, 1951, now abandoned.

I claim as my invention:

1. A static converter comprising several polyphase constituent valve converters mutually displaced in phase and connected in series on the direct current side, each of said constituent converters having valves for successively connecting the alternating current phases to the direct current terminal having a voltage of a corresponding sense while the current may flow in the opposite sense through another valve, elements directly connected to the direct current terminals and acting to keep the voltage therebetween substantially constant, and means for preventing a short-circuiting of voltage harmonics through said constituent converters.

2. A static converter composed of several polyphase constituent valve converters mutually displaced in phase, comprising means for connecting the constituent converters in series between line direct current terminals, each of said constituent converters having valve paths simultaneously open between each direct current terminal and each alternating current terminal for the passage of current in opposite directions with respect to the direct current terminals, elements directly connected to the direct current terminals and acting to keep the voltage therebetween substantially constant, and means for preventing a short-circuiting of voltage harmonics through said constituent converters.

3. A static converter as claimed in claim 1 comprising means for the parallel connection of the constituent current converters on the alternating current side and transformer windings in series with said converters, said windings having a common iron core.

4. A static converter as claimed in claim 1, comprising a condenser being connected between said line direct current terminals.

5. A static converter as claimed in claim 1, comprising condensers in parallel to groups of series-connected constituent converters on their direct current side and means for the parallel connection of the constituent current converters on the alternating current side and transformer windings in series with said converters, said windings having a common iron core.

6. A static converter as claimed in claim 1, comprising a series resonance circuit tuned for the frequency of the alternating current side connected between said line direct current terminals in parallel with each element acting to keep the voltage constant.

7. A static converter as claimed in claim 1, comprising a series resonance circuit tuned for twice the frequency of the alternating current side connected between said line direct current terminals in parallel with each element acting to keep the voltage constant.

References Cited in the file of this patent

UNITED STATES PATENTS

| | | |
|---|---|---|
| 2,193,585 | Evans | Mar. 12, 1940 |
| 2,334,045 | Temple et al. | Nov. 9, 1943 |
| 2,621,319 | Uhlmann | Dec. 9, 1952 |

FOREIGN PATENTS

| | | |
|---|---|---|
| 212,282 | Switzerland | Feb. 17, 1941 |